United States Patent
Muthaiah et al.

(10) Patent No.: US 9,477,897 B2
(45) Date of Patent: Oct. 25, 2016

(54) METHODS AND SYSTEMS FOR COMPRESSING ELECTRONIC DOCUMENTS

(71) Applicant: XEROX CORPORATION, Norwalk, CT (US)

(72) Inventors: Sivakumar Muthaiah, Srivilliputtur (IN); Apurba Das, West Bengal (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/625,019

(22) Filed: Feb. 18, 2015

(65) Prior Publication Data

US 2016/0239717 A1    Aug. 18, 2016

(51) Int. Cl.
| | | |
|---|---|---|
| G06F 15/00 | (2006.01) | |
| G06K 9/20 | (2006.01) | |
| G06K 9/00 | (2006.01) | |
| G06K 15/02 | (2006.01) | |
| H04N 1/64 | (2006.01) | |

(52) U.S. Cl.
CPC ......... *G06K 9/2063* (2013.01); *G06K 9/00463* (2013.01); *G06K 15/181* (2013.01); *H04N 1/648* (2013.01)

(58) Field of Classification Search
CPC combination set(s) only.
See application file for complete search history.

(56) References Cited

U.S. PATENT DOCUMENTS

| | | | |
|---|---|---|---|
| 6,330,363 B1 | 12/2001 | Accad | |
| 6,671,064 B2 | 12/2003 | Rumph et al. | |
| 8,384,739 B2 | 2/2013 | Maresch | |
| 8,451,484 B2* | 5/2013 | Isshiki | G06F 3/1204 358/1.1 |
| 2001/0024288 A1* | 9/2001 | Toda | G06K 15/02 358/1.9 |
| 2005/0270855 A1* | 12/2005 | Earhart | G11B 20/1217 365/189.05 |
| 2010/0033750 A1* | 2/2010 | Tischler | G06K 15/02 358/1.14 |
| 2010/0080486 A1* | 4/2010 | Maresch | G06K 9/2054 382/266 |
| 2012/0039534 A1* | 2/2012 | Malik | H03M 7/3064 382/173 |
| 2015/0242168 A1* | 8/2015 | Yu | G06F 3/1208 358/1.13 |

* cited by examiner

*Primary Examiner* — Helen Q Zong (57) ABSTRACT

The disclosed embodiments illustrate methods and systems for encoding an image. The method includes identifying one or more objects, having an associated first tag value, in the image. The first tag value is deterministic of at least a type of the one or more objects. The number of the one or more objects in the image is less than a predetermined number of objects. The method further includes assigning a second tag value to each pixel in the image to create an encoded image. The second tag value is assigned based on the type of object represented by each pixel. The size of the second tag value is less than the size of the first tag value. The method further includes defining a header field for the encoded image. The header field includes the first tag value associated with each of the one or more objects.

22 Claims, 5 Drawing Sheets

METHODS AND SYSTEMS FOR COMPRESSING ELECTRONIC DOCUMENTS

TECHNICAL FIELD

The presently disclosed embodiments are related, in general, to image processing. More particularly, the presently disclosed embodiments are related to methods and systems for compressing electronic documents.

BACKGROUND

Computing devices such as smart-phones, Personal Digital Assistants (PDAs), tablets, desktop computers, laptops, etc., are usually capable of processing and rendering images on a display device associated with such computing devices. Further, such computing devices may further have a printer device or an output device coupled with them. Such devices may be configured to print images on a paper medium or an output medium. Usually, the printer devices have limited memory space for storing the image temporarily for the purpose of printing.

With increasing resolution of the images, the amount of memory space required to store such image is increasing. Printing such images may require a large memory space in the printer device. Further, images of larger sizes may require greater printing time due to increased data processing requirements within the printer, which may reduce the speed of printing. Thus, there exists a need for compression of electronic documents such as images.

SUMMARY

According to embodiments illustrated herein, there is provided a method for encoding an image. The method includes identifying one or more objects, having an associated first tag value, in the image. The first tag value is deterministic of at least a type of the one or more objects. The number of the one or more objects in the image is less than a predetermined number of objects. The method further includes assigning a second tag value to each pixel in the image to create an encoded image. The second tag value is assigned based on the type of object represented by each pixel. The size of the second tag value is less than the size of the first tag value. The method further includes defining a header field for the encoded image. The header field includes the first tag value associated with each of the one or more objects.

According to embodiments illustrated herein, there is provided a method for decoding an image. The method includes receiving an encoded image comprising one or more objects. Each pixel in the encoded image has an associated second tag value. A number of the one or more objects is less than a predetermined number of objects. The method further includes extracting a header field of the encoded image. The header field includes a first tag value associated with each of the one or more objects. The size of the second tag value is less than the size of the first tag value. The method further comprises determining the first tag value for each pixel from the header field. The first tag value is determined based on the second tag value associated with each pixel. The first tag value for each pixel is deterministic of a type of the one or more objects represented by each pixel.

According to embodiments illustrated herein, there is provided a system for compressing an electronic document. The system includes one or more processors in a computing device that are operable to identify one or more pages of the electronic document having one or more objects. Each of the one or more objects have at least an associated first tag value deterministic of at least a type of the one or more objects. A number of the one or more objects in each of the one or more pages is less than a predetermined number of objects. The one or more processors are further operable to assign a second tag value to each pixel in each of the one or more pages to create a compressed electronic document. The compressed electronic document is created based on the type of object being represented by respective pixels. The size of the second tag value is less than the size of the first tag value. The one or more processors are further operable to define a header field for each of the one or more pages of the compressed electronic document. The header field includes the first tag value associated with each of the one or more objects.

According to embodiments illustrated herein, there is provided a system for decompressing an electronic document. The system includes one or more processors in a printing device that are operable to receive a compressed electronic document. The compressed electronic document comprises one or more pages having one or more objects. Each pixel in the one or more pages have at least an associated second tag value. A number of the one or more objects in each of the one or more pages is less than a predetermined number of objects. The one or more processors are further operable to extract a header field of each of the one or more pages. The header field includes a first tag value for each of the one or more objects. The size of the second tag value is less than the size of the first tag value. The one or more processors are further operable to determine the first tag value for each pixel in each of the one or more pages. The first tag value is determined based on the second tag value associated with each pixel and the header field. The first tag value for each pixel is deterministic of a type of the one or more objects represented by the each pixel.

According to embodiments illustrated herein, there is provided a computer program product for use with a computing device. The computer program product comprises a non-transitory computer readable medium, the non-transitory computer readable medium stores a computer program code for encoding an image. The computer readable program code is executable by one or more processors in the computing device to identify one or more objects, having an associated first tag value, in the image. The first tag value is deterministic of at least a type of the one or more objects. The number of the one or more objects in the image is less than a predetermined number of objects. The computer program code is further executable by the one or more processors to assign a second tag value to each pixel in the image to create an encoded image. The second tag value is assigned based on the type of object represented by each pixel. The size of the second tag value is less than the size of the first tag value. The computer program code is further executable by the one or more processors to define a header field for the encoded image. The header field includes the first tag value associated with each of the one or more objects.

According to embodiments illustrated herein, there is provided a computer program product for use with a computing device. The computer program product comprises a non-transitory computer readable medium, the non-transitory computer readable medium stores a computer program code for encoding an image. The computer readable program code is executable by one or more processors in the computing device to receive an encoded image comprising one or more objects. Each pixel in the encoded image has an associated second tag value. A number of the one or more objects is less than a predetermined number of objects. The computer program code is further executable by the one or more processors to extract a header field of the encoded image. The header field includes a first tag value associated with each of the one or more objects. The size of the second tag value is less than the size of the first tag value. The computer program code is further executable by the one or more processors to determine the first tag value for each pixel from the header field. The first tag value is determined based on the second tag value associated with each pixel. The first tag value for each pixel is deterministic of a type of the one or more objects represented by each pixel.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example", and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

DEFINITIONS

The following terms shall have, for the purposes of this application, the meanings set forth below.

A "computing device" refers to a device that includes a processor/microcontroller and/or any other electronic component, or a device or a system that performs one or more operations according to one or more programming instructions. In an embodiment, the computing device has an associated display that may be utilized for displaying one or more images. Examples of the computing device may include, but are not limited to, a desktop computer, a laptop, a PDA, a mobile device, an MFD, a smartphone, a tablet computer (e.g., iPad®, and Samsung Galaxy Tab®), and the like.

A "Multi-Function Device" (MFD) refers to a computing device that can perform multiple functions. Examples of the functions may include, but are not limited to, printing, scanning, copying, faxing, emailing, and the like. In an embodiment, the MFD includes a scanner and a printer for scanning and printing one or more electronic documents, respectively. In an embodiment, the MFD has communication capabilities that enable the MFD to send/receive data and messages in accordance with one or more communication protocols such as, but not limited to, HTTP, FTP, WebDAV, E-mail, SMB, NFS, and TWAIN.

"Object types" refer to types of contents included in an electronic document such as, text, background or foreground image, pictures, line arts, constant color areas, sweeps, bitmaps, strokes, etc. In an embodiment, object types may be defined for different printing devices/output devices.

An "electronic document" refers to an electronic file containing various object types and metadata information such as, but not limited to, a file-format/type, a compression/encryption scheme usable for compressing/encrypting the content, a creation/access timestamp, and so on. In an embodiment, the electronic document may be an image comprising of one or more object types. In an embodiment, the electronic document may comprise one or more pages comprising one or more object types. In an embodiment, the electronic document may be represented using one or more color schemes such as but not limited to, CMYK (Cyan-Magenta-Yellow-Black), RGB (Red-Green-Blue), HSV (Hue-Saturation-Value), YCbCr, Gray Scale, and so on.

A "pixel" refers to a smallest image element in one or more pages of an electronic document. Size of a pixel depends on resolution of screen of a display device displaying the electronic document.

An "intensity value" of a pixel in an electronic document refers to a measure of intensity corresponding to each color, of the representing color scheme, for that pixel. In an embodiment, intensity of each color, in the color scheme, for a pixel may be represented by a predetermined number of bits ($X_1$). For example, for CMYK color scheme, the intensity value of a pixel can be represented by ($4*X_1$) number of bits.

A "tag value" of a pixel corresponds to an identification (ID) assigned to each pixel based on the type of object being represented by the pixel. For example, for Xerox iGEN® class of production printers, there are 24 unique tag values to represent 24 different object types. In an embodiment, tag value for a pixel may be represented by a predetermined number of bits ($X_2$). For example, for CMYK color scheme, the tag value of a pixel is represented by ($4*X_2$) number of bits.

A "first tag value" refers to a bit string representing one or more types of objects that may be present in a page of a document. In an embodiment, a number of bits required to represent the first tag value may be determined based on number of possible object types that may be present in a page of a document. For example, if there are a total of 16 different types of objects (such as images, text, background, foreground, highlighting, etc.), the first tag value may be a bit string of 4 bits. In an embodiment, each pixel in an uncompressed page of the document may be assigned a first tag value representative of the object type being represented by the pixel.

A "second tag value" refers to a compressed representation of the first tag value. In an embodiment, a number of bits used to represent the second tag value is less than a number of bits used to represent the first tag value. Further, for each compressed page, a header field may be defined, which may provide a mapping between the second tag value and the first tag values. For example, a page that needs to be compressed includes objects of two types. If the first tag value is represented as a 4 bit value, the header may be represented as a 1 byte value with the first nibble representing the first tag value of the first object type and the second nibble representing the first tag value of the second object type. Each pixel of such compressed page may then be assigned a second tag value representative of the object type being represented by the pixel. The second tag value, in this case, may be a single bit value representing the identity of the two object types.

A "pixel value" of a pixel refers to a combination of the intensity value and the tag value of that pixel. For example, for CMYK color scheme, the pixel value of a pixel is represented by ($4*X_1+4*X_2$) number of bits.

"Compression" of an electronic document refers to processing of the electronic document such that the compressed electronic document requires lesser number of bits than the number of bits required for original representation of the electronic document.

"Decompression" of an electronic document refers to processing a compressed electronic document such that the decompressed electronic document corresponds to the original electronic document. In an embodiment, the decompressed electronic document, so created, uses the same number of bits that were initially required for the representation of the original electronic document.

Figure 1:
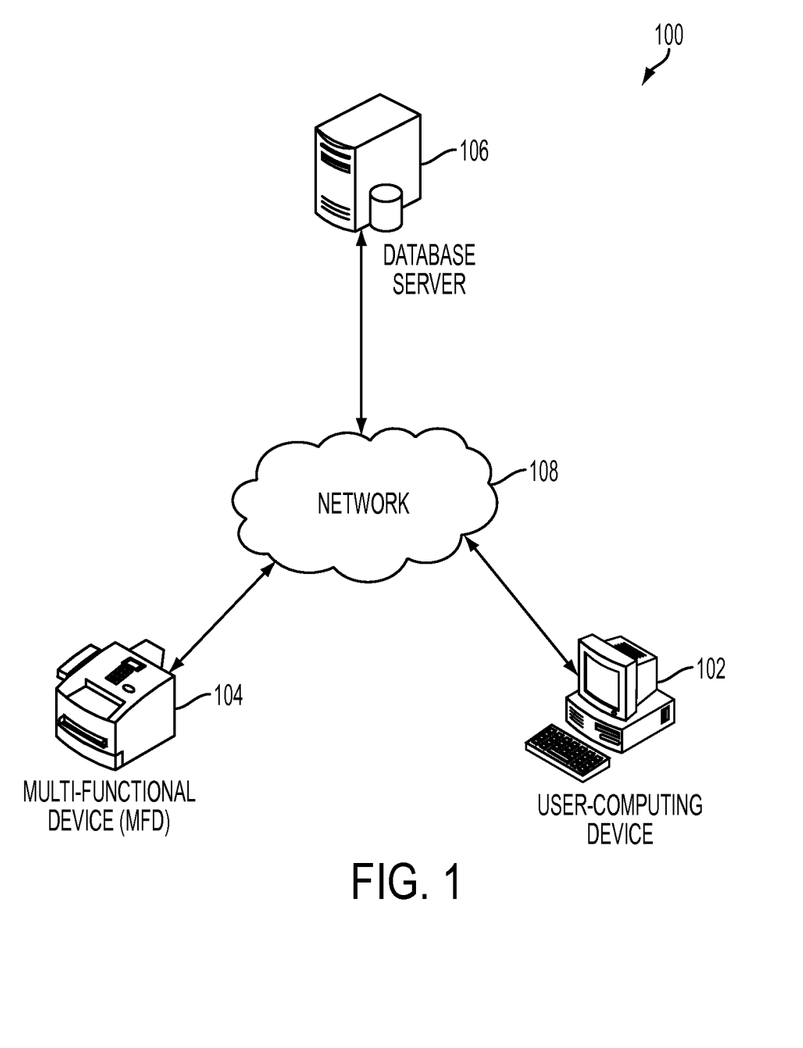
FIG. 1 is a block diagram illustrating a system environment in which various embodiments may be implemented.

FIG. 1 is a block diagram illustrating a system environment 100 in which various embodiments may be implemented. The system environment 100 includes a user-computing device 102, a Multi-Function Device (MFD) 104, a database server 106, and a network 108. Various devices in the system environment 100 (e.g., the user-computing device 102, the MFD 104, and the database server 106) may be interconnected over the network 108.

The user-computing device 102 refers to a computing device used by a user. In an embodiment, using the user-computing device 102, the user may provide inputs for processing an electronic document. In an embodiment, content in the electronic document may be represented by one or more pixels. Each of the one or more pixels may have an associated intensity value. The user may provide an input to the user-computing device 102 to print the electronic document. In order to print the electronic document, the user-computing device 102 may encode the electronic document. In an embodiment, the encoding of the electronic document may include assigning a tag value to each of the one or more pixels in the electronic document. In an embodiment, the user-computing device 102 may assign a first tag value based on the type of object being represented by the respective pixels.

In an embodiment, the electronic document may include a plurality of pages. In such a scenario, the user may provide inputs to select one or more pages from the plurality of pages. In an embodiment, the user may select the one or more pages to carry out compression of the electronic document. Thereafter, in an embodiment, the user-computing device 102 may determine a count of various object types included in each selected page of the electronic document. Based on the count of the object types in the selected pages, the user-computing device 102 may modify the tag values of the one or more pixels included in the selected pages.

In an alternate embodiment, the user-computing device 102 may select the one or more pages without the intervention of the user. In such a scenario, the user computing device 102 may automatically determine the number of object types in each of the plurality of pages. Thereafter, the user computing device 102 may select the one or more pages based on the number of object types identified.

Further, the user-computing device 102 is configured to compress the electronic document by employing one or more compression techniques. In an embodiment, the user computing device 102 is further configured to modify the first tag value with a second tag value such that the number of bits used to represent the second tag value is less than the number of bits used to represent the first tag value. Examples of such compression techniques may include, but are not limited to Xerox Multi-mode compression format (XM2), TIFF, etc.

In an embodiment, the user-computing device 102 may be also utilized for accessing the MFD 104 over the network 108. Further, the user may provide various types of inputs, as disclosed above, to access the MFD 104. In an embodiment, the user-computing device 102 may correspond to various types of computing devices, such as, but not limited to, a desktop computer, a laptop, a PDA, a mobile device, a smartphone, a tablet computer (e.g., iPad®, and Samsung Galaxy Tab®), and the like.

The MFD 104 refers to a computing device that may process the electronic document. In an embodiment, the processing of the electronic document may correspond to decompressing the compressed electronic document received from the user computing device 102. To that end, in an embodiment, the MFD 104 may identify the object type and intensity corresponding to each pixel of the electronic document. For a pixel, the MFD 104 identifies the object type and the intensity of a pixel based on the pixel value (that includes the intensity value and the tag value) of the corresponding pixel. The MFD 104 may print the decompressed electronic document. In an embodiment, the MFD 104 may apply selective half-toning, based on the tag value associated with the respective pixels, to print the electronic document. In an embodiment, the MFD 104 may scan a hard copy of a document to create the electronic document. The electronic document may be stored in a storage device associated with the user-computing device 102 and/or the database server 106.

In an embodiment, the user may provide inputs through an interface provided by the MFD 104 to process the electronic document. In an embodiment, the MFD 104 may include various types of computing devices, such as, but not limited to, printers, scanners, copiers, fax-machines, and the like.

A person having ordinary skill in the art would understand that the scope of the disclosure is not limited to the use of the MFD 104 for decompressing and/or decoding the electronic document. In an embodiment, the user-computing device 102 may decompress and/or decode the electronic document, without departing from the scope of the disclosure.

The database server 106 refers to a computing device that may store the electronic document. Further, the database server 106 may store various types of metadata information associated with the electronic document. Examples of the metadata information may include, but is not limited to, a file-format/type, a compression/encryption scheme usable for compressing/encrypting the content, a creation/access timestamp, and so on. In an embodiment, the metadata information may be accompanied along with the electronic document. In an embodiment, the database server 106 may store a unique tag value corresponding to each object type defined for the MFD 104. In an embodiment, a configuration file associated with the MFD 104 may be stored in the database server 106. The configuration file may contain the tag value corresponding to each object type defined for the MFD 104. Further, the database server 106 may store configuration files corresponding to other printing/multi-function devices in the network 108. In an embodiment, the database server 106 may receive a query from the user-computing device 102 and/or the MFD 104 for retrieving various types of information stored in the database server 106. For querying the database server 106, one or more querying languages may be utilized such as, but not limited to, SQL, QUEL, DMX and so forth. Further, the database server 106 may be realized through various technologies such as, but not limited to, Microsoft® SQL server, Oracle, and My SQL. In an embodiment, the database server 106 may connect to the user-computing device 102 and/or MFD 104, using one or more protocols such as, but not limited to, ODBC protocol and JDBC protocol.

It will be apparent to a person skilled in the art that the functionalities of the database server 106 may be incorporated into the user-computing device 102 and/or the MFD 104, without departing from the scope of the disclosure. In such a scenario, various types of information, as disclosed above, may be stored in user-computing device 102 and/or the MFD 104.

The network 108 corresponds to a medium through which content and messages flow between various devices of the system environment 100 (e.g., the user-computing device 102, the MFD 104, and the database server 106). Examples of the network 108 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 108 in accordance with various wired and wireless communication protocols such as Transmission Control Protocol and Internet Protocol (TCP/IP), User Datagram Protocol (UDP), and 2G, 3G, or 4G communication protocols.

Figure 2:
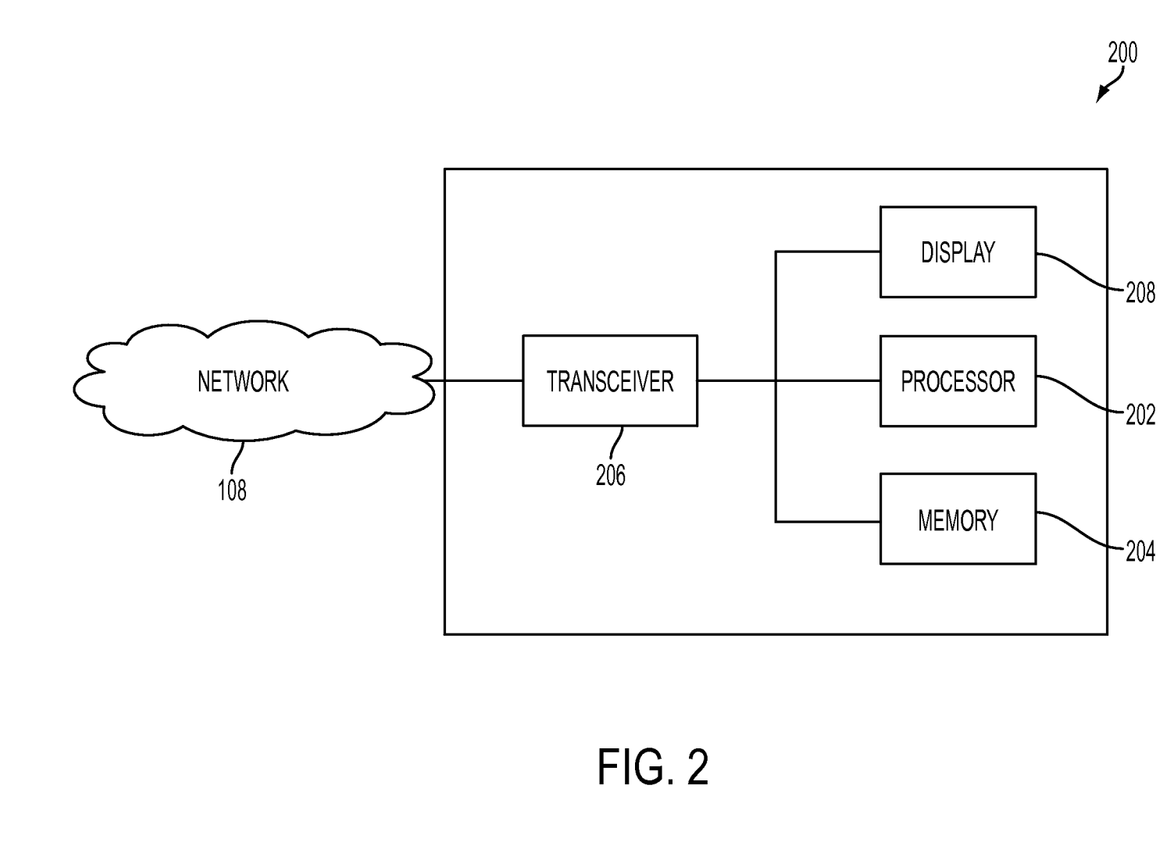
FIG. 2 is a block diagram illustrating a computing device, in accordance with at least one embodiment.

FIG. 2 is a block diagram illustrating a computing device 200, in accordance with at least one embodiment. The computing device 200 may correspond to at least one of the user-computing device 102 or the MFD 104. In an embodiment, the computing device 200 includes a processor 202, a memory 204, a transceiver 206, and a display 208.

The processor 202 is coupled to the memory 204, the transceiver 206, and the display 208. The processor 202 includes suitable logic, circuitry, and/or interfaces that are operable to execute one or more instructions stored in the memory 204 to perform pre-determined operation. The memory 204 may be operable to store the one or more instructions. The processor 202 may be implemented using one or more processor technologies known in the art. Examples of the processor 202 include, but are not limited to, an x86 processor, a RISC processor, an ASIC processor, a CISC processor, or any other processor. In an embodiment, the processor 202 may be an image processor to perform various image processing functions on the electronic document.

The memory 204 stores a set of instructions and data. Some of the commonly known memory implementations include, but are not limited to, a Random Access Memory (RAM), a Read Only Memory (ROM), a Hard Disk Drive (HDD), and a Secure Digital (SD) card. Further, the memory 204 includes the one or more instructions that are executable by the processor 202 to perform specific operations. It will be apparent to a person having ordinary skill in the art that the one or more instructions stored in the memory 204 enables the hardware of the computing device 200 to perform the predetermined operation.

The transceiver 206 transmits and receives messages and data to/from various components of the system environment 100. Examples of the transceiver 206 may include, but are not limited to, an antenna, an Ethernet port, an USB port or any other port that can be configured to receive and transmit data. The transceiver 206 transmits and receives data/messages in accordance with various communication protocols, such as, TCP/IP, UDP, and 2G, 3G, or 4G communication protocols.

The display 208 facilitates the user to view information presented on the computing device 200. For example, the user may view the images on the display 208. The display 208 may be realized through several known technologies, such as Cathode Ray Tube (CRT) based display, Liquid Crystal Display (LCD), Light Emitting Diode (LED) based display, Organic LED based display, and Retina Display® technology. In an embodiment, the display 208 can be a touch screen that is operable to receive a user-input.

Figure 3:
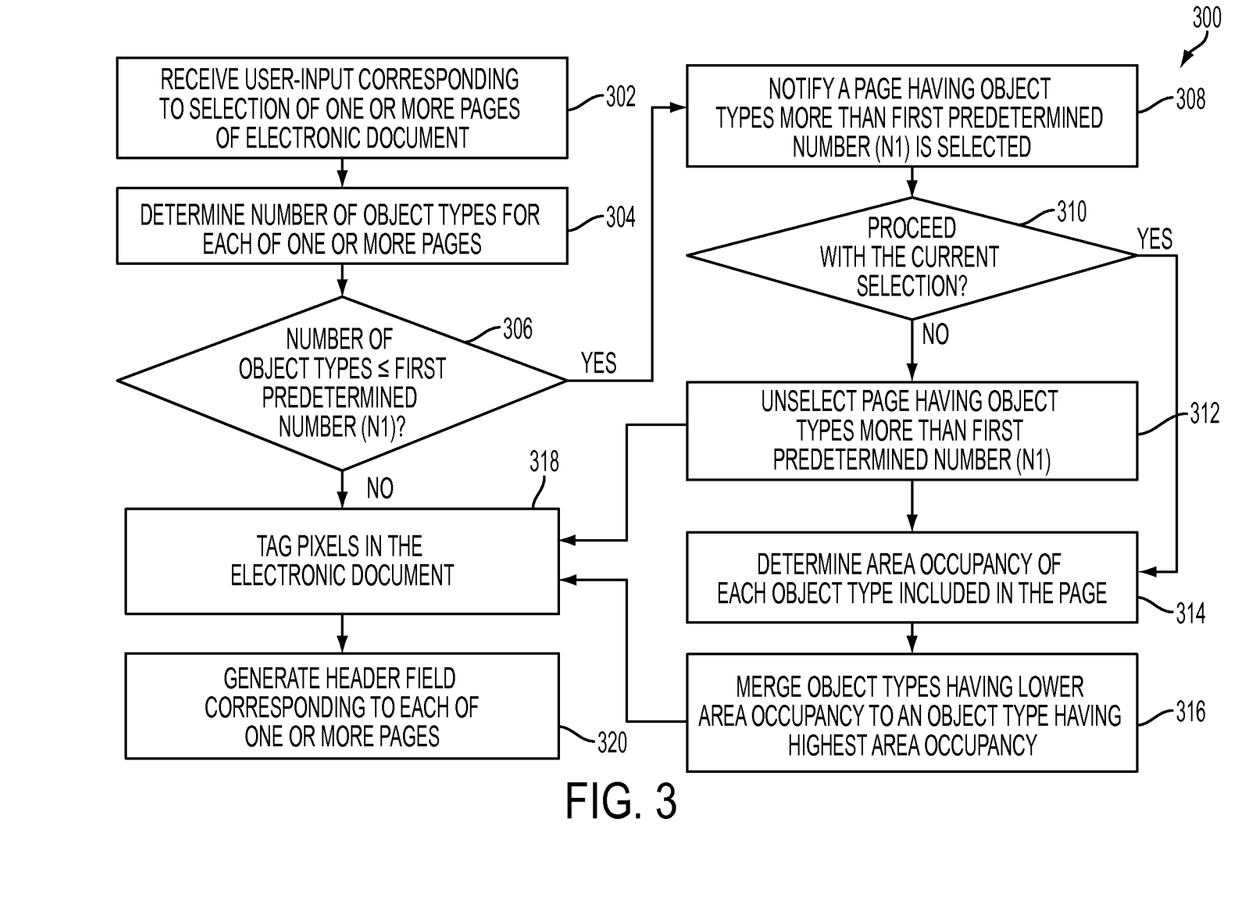
FIG. 3 is a flowchart illustrating a method for compressing an electronic document, in accordance with at least one embodiment.
Figure 4:
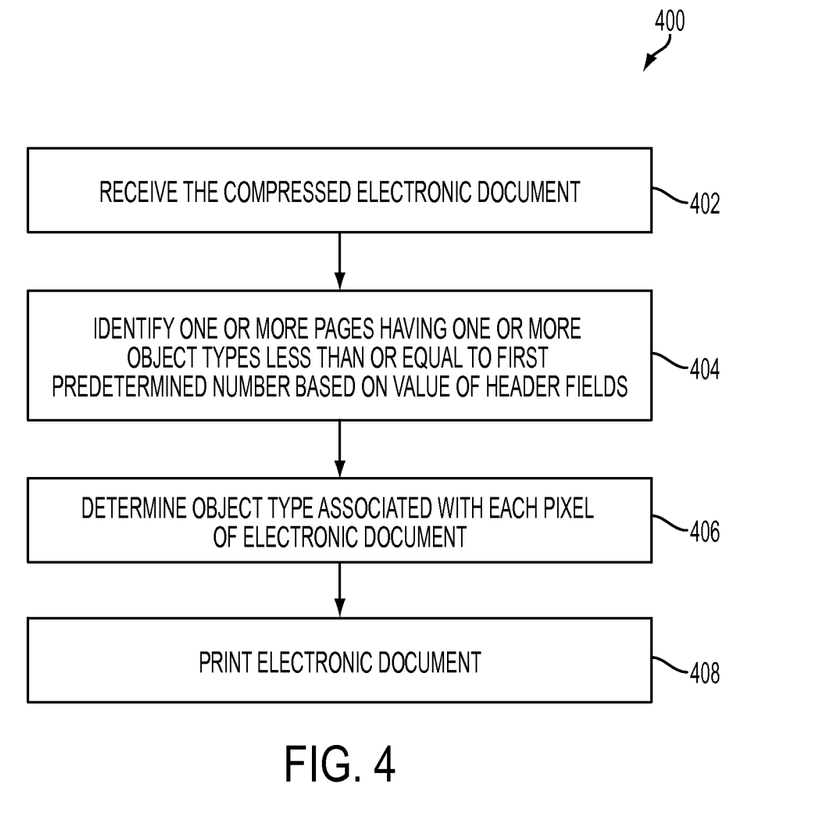
FIG. 4 is a flowchart illustrating a method for decompressing an electronic document, in accordance with at least one embodiment.

An embodiment of the operation of the computing device 200 for processing of the electronic document has been described in conjunction with FIGS. 3 and 4. The computing device 200 has been considered as the user-computing device 102 for the purpose of description of FIG. 3 and as the MFD 104 for the purpose of description of FIG. 4.

In a scenario where the computing device 200 is considered as the MFD 104, the computing device 200 may further include a printer (not shown) and a scanner (not shown).

FIG. 3 is a flowchart 300 illustrating a method for compressing the electronic document, in accordance with at least one embodiment. The flowchart 300 is described in conjunction with FIG. 1 and FIG. 2.

At step 302, a user-input corresponding to selection of one or more pages of the electronic document is received. In an embodiment, the processor 202 is configured to receive the user-input. In an embodiment, a user of the user-computing device 102 may provide the user-input through a user-interface presented on the user-computing device 102. In an embodiment, the user may select the one or more pages as those pages in which a number of constituent object types is less than or equal to a first predetermined number (N1).

A person skilled in the art would appreciate that the scope of the disclosure is not limited to selecting the one or more pages of the electronic documents based on the user-input. In an embodiment, the processor 202 may select the one or more pages automatically (without the intervention of the user) based on the number of constituent object types in the one or more pages being less than the first predetermined number (N1).

At step 304, a number of object types in each of the one or more pages of the electronic document is determined. In an embodiment, the processor 202 is operable to determine the number of object types in each of the one or more pages. In an embodiment, each page of the electronic document is represented using Page Description Language (PDL) file. In an embodiment, the processor 202 may decompose the PDL file of each of the one or more pages to form a data structure. The data structure may include a list of object types. The processor 202 may determine the number of object types for each of the one or more pages from the data structure.

At step 306, a check is performed to determine whether the number of object types determined for each of the one or more pages is less than or equal to the first predetermined number (N1). In an embodiment, the processor 202 performs the check. In instances where at least one page of the one or more pages include more than the first predetermined number (N1) of the object types, the method proceeds to step 308. Else the method proceeds to step 318.

At step 308, a notification may be generated. In an embodiment, the processor 202 generates the notification. In an embodiment, the notification may be indicative of the user having selected the at least one page with number of object types greater than the first predetermined number (N1). Further, the notification may prompt the user whether to proceed with the selected at least one page or not. In an embodiment, the processor 202 may present the notification to the user on the display 208 of the user-computing device 102. In another embodiment, the notification may be output via an audio device associated with the user-computing device 102.

At step 310, a check is performed to determine whether the user wishes to proceed with the selected at least one page. In an embodiment, the processor 202 may perform the check based on an input received from the user. In an embodiment, the user may respond to the notification using an input device (e.g., keyboard, computer-mouse, and touch interface) of the user-computing device 102. In instances where the user's response indicates that the user does not wish to proceed with the selected at least one page, the method proceeds to step 312. At step 312, the selected at least one page is unselected and the method proceeds to step 318. In instances where the user's response indicates that the user wishes to proceed with the selected at least one page, the method proceeds to step 314.

At step 314, area occupancy of each object type included in the at least one page is determined. In an embodiment, the processor 202 may determine the area occupancy. In an embodiment, the area occupancy of an object type may refer to the number of pixels in the at least one page occupied by that object type.

At step 316, object types having lower area occupancy are merged with an object type having highest area occupancy. In an embodiment, the processor 202 may merge the object types having lower area occupancy with the object types having higher area of occupancy. For example, the processor 202 may identify a first object that occupies a highest area in the page (for instance, an object having around 50% or more area). Thereafter, the processor 202 may create a second object by merging the rest of the objects within the page. Alternatively, the processor 202 may merge the objects having lesser areas of occupancies with the object occupying the highest area of occupancy as the object of first type. Further, the processor 202 may denote the object with the second highest area of occupancy as the object of the second type.

Prior to merging the two object types, the processor 202 may determine the first tag value corresponding to each of the one or more object types in the at least one page. In an embodiment, the database 106 stores a tag value corresponding to each object type defined for the MFD 104. The tag value is unique for each of the object type defined for the MFD 104. In an embodiment, a configuration file, such as, "server.config" file associated with the MFD 104, may be stored in the database server 106. The configuration file may contain the tag value corresponding to each object type defined for the MFD 104. In an embodiment, the configuration file may comprise a table storing the tag values in an associated relationship with the object types. Table 1 illustrates an example of the table corresponding to the tag value for each object type defined for MFD 104:

TABLE 1

Example of a table corresponding to the tag value for each object type

| Object Type | Tag Value | First Tag Value |
|---|---|---|
| Object type 1 | 0 | 0000 |
| Object type 2 | 1 | 0001 |
| . . . | . . . | . . . |
| . . . | . . . | . . . |
| Object type 16 | 15 | 1111 |

In an embodiment, the first tag value of each of the one or more object types is obtained by encoding the tag value of the respective object types into binary data. A number of bits used to represent the first tag value depends on the total number of object types defined for the MFD 104. For example, for 16 different object types, the first tag value is represented using 4 bits. In an embodiment, the processor 202 may encode the tag value using a second predetermined number of bits (N2). In the above example, the second number of bits (N2) may be 4 as there are 16 different object types. In an embodiment, the processor 202 may determine the first tag value from the database server 106.

Post determining the first tag values of the objects in the at least one page, the two objects are merged. In an embodiment, merging of the object types refer to assigning the first tag value associated with the object type having the highest area occupancy to the object types having the lower area occupancy. Alternatively, the merging may refer to grouping of the objects of lesser areas of occupancies together as a single object and assigning the first tag value of one of such objects to the entire group of merged objects. For instance, the first tag value of an object occupying a relatively larger area among the group of the objects may be assigned to each object in the group. As the first tag value assigned to an object may not be same as the object's original first tag value, this results in lossy compression of the electronic document. In an embodiment, the object types are mapped in such a manner that the effective number of object types in the at least one page, after mapping, is equal to the first predetermined number (N1). The method then proceeds to step 318.

A person skilled in the art would appreciate that the scope of the disclosure should not be limited to the merging of the objects based on their relative areas of occupancies as described above. The objects may be merged in any other manner, using any other criteria, without departing from the spirit of the disclosure.

Further, at step 306, in instances where at least one page of the one or more pages does not include more than the first predetermined number (N1) of the object types, the method proceeds to step 318.

At step 318, each pixel in the electronic document is tagged using a tag value that represents the object type of the respective pixel. In an embodiment, the processor 202 may assign the tag value to each pixel in the electronic document. To that end, a second tag value representing the one or more object types is assigned to each pixel in the one or more pages. In an embodiment, the processor 202 is operable to assign the second tag value to each pixel of the one or more pages. In an embodiment, the processor 202 may determine the second tag value based on the first predetermined number of object types (N1). For example, if the first predetermined number of object types is two, the processor 202 may determine the second tag values as '1' and '0'. In an embodiment, the second tag value '1' may be used for representing the first object type. Similarly, the second tag value '0' may be used for representing the second object type. Thereafter, the processor 202 may assign the second tag values to each pixel in the one or more pages based on the respective object type being represented by each pixel. In an embodiment, the second tag value is represented using a third predetermined number of bits (N3), less than the second predetermined number of bits (N2).

Further, a first tag value representing the object types is assigned to each pixel in the other pages (that have the number objects types greater than the predetermined number (N1)) of the electronic document. In an embodiment, the processor 202 is operable to assign the first tag value to each pixel in the other pages of the electronic document. The first tag value is represented using the second predetermined number of bits (N2).

As the number of bits being used in the second tag is less than the first tag, the space consumed by an electronic document, which uses the second tag values to tag each pixel in the one or more pages is less in comparison to an electronic document in which pixels in all the pages are tagged using the first tag values. Thus, the electronic document is optimally compressed at a raw bit-stream level. A person skilled in the art would appreciate that the electronic document may be subject to further compression using one or more lossy or lossless compression schemes. Further, the intensity component of the pixels may be compressed separately (e.g., lossless for text and graphics and lossy for graphics) from the tag value component of the pixels (e.g., lossless like gzip, etc.).

At step 320, a header field corresponding to each of the one or more pages of the electronic document is generated. In an embodiment, the processor 202 is configured to generate the header field. The header field corresponding to a page, of the one or more pages, includes the first tag value of each of the one or more object types included in that page. In an embodiment, the header field may act as a mapping index between the first tag values and the second tag values.

For example, the header field may be an 8-bit field in case of two object types, which may be represented by first tag values of 4-bits each. Thus, the first nibble in the header field may be representative of the first tag value of the object of the first type, while the second nibble in the header field may be representative of the first tag value of the object of the second type in the page. If the header field is defined for a page, it may be indicative that the page corresponds to a compressed page and each pixel in the compressed page is tagged using the second tag values. On the other hand, if the header field is not defined for a page (i.e., value '00000000'), the page may not be compressed and each pixel may be tagged using the first tag values.

In an embodiment, the processor 202 may automatically select the one or more pages (having the one or more object types less than or equal to the first predetermined number (N1)) from the electronic document. In order to select the one or more pages, the processor 202 may determine the number of objects in each of the plurality of pages in the electronic document by decomposing the PDL. In an alternate embodiment, the processor 202 may employ one or more known image processing techniques to determine the number of objects in each of the plurality of pages. In such a scenario, any page having more than the first predetermined number (N1) of the object types cannot possibly be selected and hence, merging of the object types is not required. Thus, lossless compression is ensured when the processor 202 selects the one or more pages.

After the processor 202 selects the one or more pages, the method proceeds to step 318 and continues to step 320 as described above. Thereafter, in an embodiment, the compressed electronic document is sent to the MFD 104.

A person skilled in the art would appreciate that the examples of the first and the second tag values are for illustrative purposes only and should not be construed to limit the scope of the disclosure.

FIG. 4 is a flowchart 400 illustrating a method for decompressing the electronic document, in accordance with at least one embodiment. The flowchart 400 is described in conjunction with FIG. 1, FIG. 2, and FIG. 3.

At step 402, the electronic document compressed using the method described above (in conjunction with FIG. 3) is received. In an embodiment, the MFD 104 may receive the compressed electronic document from the user-computing device 102. In an embodiment, the transceiver 206 is operable to receive the compressed electronic document from the user-computing device 102. In an embodiment, the electronic document is received when a command to print the electronic document is generated by the user-computing device 102.

At step 404, the one or more pages of the electronic document, having one or more object types less than or equal to the first predetermined number (N1), are identified. In an embodiment, the processor 202 is configured to identify the one or more pages based on the value in the header field. For example, if the value of the header field is '00000000', the pixels in the page, for which the header field has been defined, have include standard tag values (i.e., first tag values). If the header field has value other than '00000000', the page for which the header field has been defined corresponds to the compressed page (i.e., pixels in the page have associated second tag values). In an embodiment, pages of the electronic document for which the header field is defined are identified as the one or more pages.

At step 406, object type associated with each pixel of the electronic document is determined. In an embodiment, the processor 202 is operable to determine the object type associated with each pixel of the electronic document.

For each pixel of the one or more pages, the second tag value is determined. Then, the first tag value corresponding to the second tag value of each pixel of the one or more pages is determined from the header field of the respective one or more pages. An object type included in each pixel of the one or more pages is identified based on the first tag value. In an embodiment, an object type corresponding to each pixel of the one or more pages may be identified by referring the first tag value from the configuration file, corresponding to the MFD 104, stored in the database server 106.

For each pixel of the pages, other than the one or more pages of the electronic document, the first tag value is determined. An object type included in each pixel is identified based on the first tag value. In an embodiment, an object type corresponding to each pixel may be identified by referring the first tag value from the configuration file, corresponding to the MFD 104, stored in the database server 106.

At step 408, the electronic document is printed. In an embodiment, the processor 202 is operable to apply selective half-toning based on the determined object type of each pixel of the electronic document. The MFD 104 prints the electronic document based on the half-toning applicable for each pixel of the electronic document.

Figure 5:
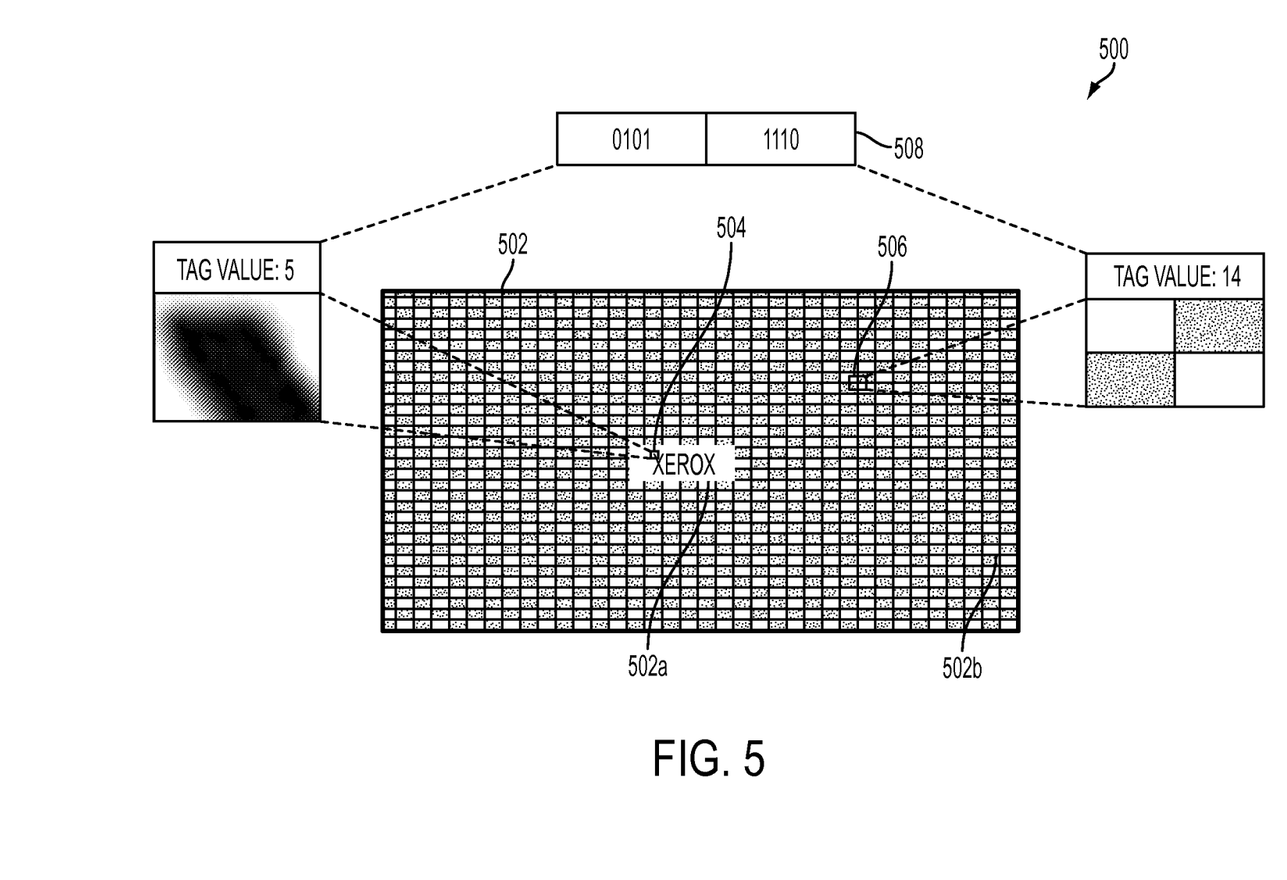
FIG. 5 is an exemplary block diagram illustrating for compression and decompression of an electronic document, in accordance with at least one embodiment.

FIG. 5 is an exemplary block diagram 500 illustrating compression and decompression of an electronic document, in accordance with at least one embodiment. FIG. 5 is described in conjunction with FIG. 3 and FIG. 4.

For the purpose of illustration, 16 different object types are defined for the MFD 104 in the configuration file stored in the database server 106. Each of the object types has a corresponding tag value in the range of 0-15. The first tag value corresponding to each object type is obtained by encoding the tag value of the respective object types into binary data. Thus, the first tag value for different object types lies in the range of 0000-1111. Further, the first predetermined number (N1) is 2.

As shown in FIG. 5, an electronic document that is to be compressed has been depicted by 502. The electronic document 502 is an image having object types less than or equal to the first predetermined number (N1=2). The electronic document 502 includes two object types such as 502a and 502b. For the purpose of illustration, the tag values corresponding to the object types 502a and 502b are considered to be 5 and 14, respectively. Thus, the corresponding first tag values for the object types 502a and 502b may be 0101 and 1110, respectively.

Since only two object types are present in the electronic document 502, the tag values of the object types 502a and 502b can be uniquely represented using a single binary bit rather than using the 4 bit first tag value. For example, the object types 502a and 502b can be uniquely represented by binary bits 0 and 1, respectively. Thus, the second tag values 0 and 1 are assigned to the object types 502a and 502b, respectively.

Thereafter, as explained earlier (at step 320) a header field 508 is generated for the electronic document 502. The header field 508 includes the 4 bit first tag values of the object types 502a and 502b.

Further, as explained earlier (at step 318) each pixel of the electronic document 502 is tagged using the second tag value. Thus, each pixel corresponding to the object type 502a such as a pixel 504 is tagged using bit 0, and each pixel corresponding to the object type 502b such as a pixel 506 is tagged using bit 1. Thus, compression ratio of the electronic document is significantly improved by tagging each pixel using one bit only, instead of four bits.

Further, as explained earlier (at step 406), during decompression of the electronic document 502, the first tag value corresponding to the second tag value for each pixel is determined from the header 506 of the compressed electronic document 502. An object type included in each pixel of the electronic document 502 is determined based on the first tag value of the respective pixels. The configuration file stored in the database server 106 may be referred to determine an object type corresponding to the first tag value of each pixel.

Further, as explained earlier (at step 408) the electronic document is printed. Selective half-toning (which may use settings defined in the system configuration file) is applied based on the determined object type of each pixel to print the electronic document 502.

The electronic document 502 described in conjunction with FIG. 5 is a single page electronic document. A person having ordinary skill in the art would appreciate that the scope of the disclosure is not limited to electronic documents having a single page. The electronic document 500 may have multiple pages. Compression and decompression of multiple pages can be performed in a manner similar to that described in conjunction with FIG. 3, FIG. 4, and FIG. 5.

Further a person having ordinary skill in the art would appreciate that the scope of the disclosure is not limited to the first predetermined value (N1) being equal to 2. For example, when 4 different object types are included in the electronic document, the tag values of the 4 different object types can be uniquely represented using 2-bits binary value rather than using the 4 bit first tag value. In such an exemplary scenario, the second tag value is a 2-bit binary value.

The disclosed embodiments encompass numerous advantages. As discussed in various embodiments of the disclosure, each of the one or more pages of the electronic document having object types less than or equal to the first predetermined number (N1) are optimally tagged. The object types of the one or more pages are tagged using lesser number of bits as compared to the original number of bits required to encode the object types. Thus, such optimized tagging of the object types in the one or more pages of the electronic document results in compression of the electronic document.

Further, the disclosure provides for lossy and lossless compression of the electronic document. When a user wishes to perform lossy compression, identical tag values are assigned to multiple object types based on the area occupancy of the object types included in the pages of the electronic document having object types greater than the first predetermined number (N1). Thereafter, optimized tagging is performed for the object types. Further, when a user wishes to perform lossless compression, the computing device 200 selects only those pages of the electronic document having object types less than or equal to the first predetermined number (N1). Thereafter, optimized tagging is performed on the object types of the selected pages only.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for image processing have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for encoding an image, the method comprising:
    identifying, by an image processor, one or more objects in the image, each of the one or more objects having at least an associated first tag value deterministic of at least a type of the one or more objects;
    assigning, by the image processor, a second tag value to each pixel in the image to create an encoded image based on the type of object being represented by each pixel, respectively, when a number of types of the one or more objects in the image is less than a predetermined number of object types, wherein the size of the second tag value is less than the size of the first tag value; and
    defining, by the image processor, a header field for the encoded image to include the first tag value associated with each of the one or more objects and the second tag value mapped with the first tag value.

2. The method of claim 1, wherein the first tag value and the second tag value are unique for each of the one or more objects, and wherein the first tag value and the second tag value are utilizable by a printer device to identify the type of the one or more objects included in the image.

3. The method of claim 2 further comprising transmitting the encoded image to the printer device.

4. The method of claim 3, wherein the first tag value is determined from a configuration file associated with the printer device.

5. The method of claim 1, further comprising determining, by the image processor, an area occupancy of each object type included in the page.

6. The method of claim 1, further comprising merging, by the image processor, a type of an object having lower area occupancy with a type of another object having higher area occupancy.

7. A method for decoding an image, the method comprising:
    receiving, by an image processor, an encoded image comprising one or more objects, each pixel in the encoded image having an associated second tag value assigned when a number of types of the one or more objects is less than a predetermined number of object types;

extracting, by the image processor, a header field, of the encoded image, including a first tag value for each of the one or more objects and the second tag value mapped with the first tag value, and wherein the size of the second tag value is less than the size of the first tag value; and determining, for each pixel by the image processor, the first tag value based on the second tag value associated with each pixel and the header field, wherein the first tag value for each pixel is deterministic of a type of the one or more objects represented by each pixel.

8. The method of claim 7, wherein the first tag value and the second tag value are unique for each of the one or more objects.

9. A system for compressing an electronic document, the system comprising:

in a computing device comprising one or more processors, the one or more processors being operable to:

identify one or more pages of the electronic document having one or more objects, each of the one or more objects having at least an associated first tag value deterministic of at least a type of the one or more objects;

assign a second tag value to each pixel in each of the one or more pages to create a compressed electronic document based on the type of object being represented by each pixel, respectively, when a number of types of the one or more objects in the image is less than a predetermined number of object types, wherein the size of the second tag value is less than the size of the first tag value; and define a header field for each of the one or more pages of the compressed electronic document to include the first tag value associated with each of the one or more objects and the second tag value mapped with the first tag value.

10. The system of claim 9, wherein the first tag value and the second tag value are unique for each of the one or more objects.

11. The system of claim 9, wherein the one or more processors are further operable to transmit the compressed electronic document to a printer device.

12. The system of claim 11, wherein a configuration file associated with the printer device stores the first tag value associated with each of the predetermined number of object types.

13. The system of claim 9 further comprising an input device configured to receive an input representative of selection of the one or more pages by a user.

14. The system of claim 13, wherein the one or more processors are further operable to generate a notification when the selected one or more pages includes a page having the number of types of the one or more objects in the image more than the predetermined number of object types.

15. The system of claim 13, wherein when the user selects a page having the number of types of the one or more objects in the image more than the predetermined number of object types, pixels associated with at least one object of the one or more objects is assigned the first tag value same as the first tag value associated with the pixels representing a first object from the one or more objects.

16. The system of claim 15, wherein the area occupancy of the first object is highest among the one or more objects in the page.

17. A system for decoding an electronic document, the system comprising:

in a printer device comprising one or more processors, the one or more processors being operable to:

receive a compressed electronic document comprising one or more pages having one or more objects, each pixel in the one or more pages having at least an associated second tag value assigned when a number of types of the one or more objects in each of the one or more pages is less than a predetermined number of object types;

extract a header field of each of the one or more pages including a first tag value for each of the one or more objects and the second tag value mapped with the first tag value, and wherein the size of the second tag value is less than the size of the first tag value; and determine, for each pixel in each of the one or more pages, the first tag value based on the second tag value associated with the each pixel and the header field, wherein the first tag value for the each pixel is deterministic of a type of the one or more objects represented by the each pixel.

18. The system of claim 17, wherein the one or more processors identify the one or more pages of the electronic document based on the header field associated with each of the one or more pages.

19. The system of claim 17, wherein a configuration file associated with the printer device stores the first tag value associated with each of the predetermined number of object types.

20. The system of claim 17, wherein the one or more processors are further operable to print the electronic document based on the first tag value of each pixel and an intensity value of each pixel of the electronic document.

21. A computer program product for use with a computer, the computer program product comprising a non-transitory computer-readable medium storing a computer-readable program code embodied therein, the computer-readable program code is executable by one or more processor to:

identify one or more objects in the image, each of the one or more objects having at least an associated first tag value, wherein the first tag value is deterministic of at least a type of the one or more objects;

assign a second tag value to each pixel in the image to create an encoded image based on the type of object being represented by the each pixel, respectively, when a number of types of the one or more objects in the image is less than a predetermined number of object types, wherein the size of the second tag value is less than the size of the first tag value; and define a header field for the encoded image to include the first tag value associated with each of the one or more objects and the second tag value mapped with the first tag value.

22. A computer program product for use with a computer, the computer program product comprising a non-transitory computer-readable medium storing a computer-readable program code embodied therein for printing an image, the computer-readable program code is executable by the one or more processors to:

receive an encoded image comprising one or more objects, each pixel in the encoded image having at least an associated second tag value assigned when a number of types of the one or more objects is less than a predetermined number of object types;

extract a header field of the encoded image, including a first tag value for each of the one or more objects and the second tag value mapped with the first tag value, and wherein the size of the second tag value is less than the size of the first tag value;

determine the first tag value based on the second tag value associated with the each pixel and the header field, wherein the first tag value for the each pixel is deterministic of a type of the one or more objects represented by the each pixel; and print the image based on the determined first tag value of each pixel of the encoded image.

* * * * *